US010331794B2

(12) United States Patent
Waibel et al.

(10) Patent No.: US 10,331,794 B2
(45) Date of Patent: *Jun. 25, 2019

(54) HYBRID, OFFLINE/ONLINE SPEECH TRANSLATION SYSTEM

(71) Applicant: Facebook, Inc., Menlo Park, CA (US)

(72) Inventors: Naomi Aoki Waibel, Murrysville, PA (US); Alexander Waibel, Murrysville, PA (US); Christian Fuegen, Saratoga, CA (US); Kay Rottmann, Karlsruhe (DE)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,068

(22) Filed: Aug. 26, 2016

(65) Prior Publication Data

US 2016/0364385 A1 Dec. 15, 2016

Related U.S. Application Data

(63) Continuation of application No. 13/915,820, filed on Jun. 12, 2013, now Pat. No. 9,430,465.

(Continued)

(51) Int. Cl.
*G06F 17/28* (2006.01)
*G10L 13/00* (2006.01)
(Continued)

(52) U.S. Cl.
CPC ........... *G06F 17/289* (2013.01); *G10L 13/02* (2013.01); *G10L 13/00* (2013.01); *G10L 15/30* (2013.01)

(58) Field of Classification Search
None
See application file for complete search history.

(56) References Cited

U.S. PATENT DOCUMENTS

| 10,133,738 B2 * | 11/2018 | Huang | G06F 17/2872 |
| 2002/0072918 A1 * | 6/2002 | White | G10L 15/30 704/270.1 |

(Continued)

FOREIGN PATENT DOCUMENTS

| CN | 1755670 A | 4/2006 |
| JP | 2003-010855 A | 1/2003 |
| JP | 2006-099296 A | 4/2006 |

OTHER PUBLICATIONS

Japan Patent Office, Office Action, Japanese Application No. 2016-513973, dated Jan. 17, 2017, five pages.

(Continued)

*Primary Examiner* — Fariba Sirjani
(74) *Attorney, Agent, or Firm* — Fenwick & West LLP

(57) ABSTRACT

A hybrid speech translation system whereby a wireless-enabled client computing device can, in an offline mode, translate input speech utterances from one language to another locally, and also, in an online mode when there is wireless network connectivity, have a remote computer perform the translation and transmit it back to the client computing device via the wireless network for audible outputting by client computing device. The user of the client computing device can transition between modes or the transition can be automatic based on user preferences or settings. The back-end speech translation server system can adapt the various recognition and translation models used by the client computing device in the offline mode based on analysis of user data over time, to thereby configure the client computing device with scaled-down, yet more efficient and faster, models than the back-end speech translation server system, while still be adapted for the user's domain.

12 Claims, 8 Drawing Sheets

Related U.S. Application Data

(60) Provisional application No. 61/822,629, filed on May 13, 2013.

(51) Int. Cl.
*G10L 13/02* (2013.01)
*G10L 15/30* (2013.01)

(56) References Cited

U.S. PATENT DOCUMENTS

| | | | | |
|---|---|---|---|---|
| 2003/0046074 | A1* | 3/2003 | Ruback | G10L 15/30 704/255 |
| 2003/0069898 | A1* | 4/2003 | Christodoulou | G06F 17/30722 |
| 2004/0102957 | A1 | 5/2004 | Levin | |
| 2004/0249635 | A1* | 12/2004 | Bennett | G06F 17/27 704/222 |
| 2005/0227768 | A1* | 10/2005 | Blackburn | G06F 17/289 463/42 |
| 2005/0234700 | A1* | 10/2005 | Li | G06F 17/2836 704/2 |
| 2006/0080079 | A1* | 4/2006 | Yamabana | G06F 17/289 704/2 |
| 2008/0221862 | A1* | 9/2008 | Guo | G06F 17/289 704/2 |
| 2008/0262828 | A1* | 10/2008 | Och | G06F 17/2818 704/3 |
| 2010/0057451 | A1* | 3/2010 | Carraux | G10L 15/30 704/231 |
| 2010/0250239 | A1* | 9/2010 | Itakura | G06F 17/30011 704/10 |
| 2011/0015928 | A1* | 1/2011 | Odell | G10L 15/30 704/257 |
| 2011/0307241 | A1* | 12/2011 | Waibel | G10L 15/265 704/2 |
| 2012/0109627 | A1* | 5/2012 | Yassa | G06F 17/2854 704/2 |
| 2012/0109632 | A1 | 5/2012 | Sugiura et al. | |
| 2012/0136646 | A1 | 5/2012 | Kraenzel et al. | |
| 2012/0250669 | A1* | 10/2012 | Lu | H04W 60/00 370/338 |
| 2013/0007405 | A1* | 1/2013 | Caskey | G06F 17/30902 711/206 |
| 2013/0138421 | A1* | 5/2013 | Moulder | G06F 17/28 704/3 |
| 2014/0081620 | A1* | 3/2014 | Solntseva | G06F 17/28 704/3 |
| 2014/0288913 | A1* | 9/2014 | Shen | G06F 17/289 704/2 |
| 2015/0120296 | A1* | 4/2015 | Stern | G10L 15/30 704/236 |

OTHER PUBLICATIONS

Australian Government, IP Australia, Patent Examination Report No. 1, Australian Application No. 2014265782, Oct. 6, 2016, two pages.
Canadian Patent Office, Office Action for CA Application No. 2,907,775, dated Sep. 20, 2016, five pages.
Korean Intellectual Property Office, Notice of Preliminary Rejection, Korean Application No. 10-2015-7030930, dated Oct. 21, 2016, six pages.
State Intellectual Property Office of the People's Republic of China, First Office Action, Chinese Patent Application No. 2014800273134, dated Feb. 22, 2017, twenty pages.
European Patent Office, Office Action, EP Patent Application No. 14167420.0, dated Dec. 20, 2017, nine pages.

* cited by examiner

HYBRID, OFFLINE/ONLINE SPEECH TRANSLATION SYSTEM

CROSS-REFERENCE TO RELATED APPLICATIONS

This application is a continuation of U.S. patent application Ser. No. 13/915,820, filed Jun. 12, 2013, which claims the benefit of U.S. Provisional Patent Application Ser. No. 61/822,629, filed May 13, 2013, both of which are incorporated by reference in their entirety.

BACKGROUND

1. Technical Field

This disclosure relates to speech translation systems, and more specifically, to a camera mount for a helmet.

2. Description of the Related Arts

Speech-to-speech translation (STS) systems are usually delivered in one of two different forms: online over the Internet or offline embedded on a user's device (e.g., smartphone or other suitable computing device). The online version has the advantage that it can benefit from significant processing resources on a large server (the cloud), and provides a data feed to the service provider that makes improvements and customization possible. However, online processing requires continuing network connectivity, which cannot be guaranteed in all locations or is not desirable in some instances due to roaming costs or privacy/security concerns. As alternative deployment, speech-to-speech translators, such as JIBBIGO speech translation apps, can be delivered as software running embedded locally on the smartphone itself, and no network connectivity is needed after the initial download of the translation application. Such offline embedded speech translation capability is the preferred deployment for many if not most practical situations where language support is needed, as networks may not be available, intermittent or too expensive. Most travelers experience such intermittent or absent connectivity, for example, during airline flights, remote geographic locations, buildings, or simply because data roaming is turned off to avoid the associated roaming charges while traveling in a foreign country.

The way such speech translation services or software are delivered also has implications to what extent the software can/must operate in a domain-dependent or -independent manner and whether it can adapt to the user's context. STS systems will usually work rather well for a domain and not so well for another domain (domain-dependence) if they have been closely optimized and tuned to a specific domain of use, or they attempt domain-independence by working more or less equally well for all domains. Either solution limits performance for all specific situations.

A user commonly runs an online client program on his/her computing device. This device typically digitizes and possibly encodes speech, then transmits samples or coefficients over a communication line to a server. The server then performs the heavy computation speech recognition and/or translation and sends the result back to the user via a communication line, and the result is displayed on the user's device. Different online designs have been proposed that move different parts of a processing chain off to the server and do more or less computing work on the device. In speech recognition, translation and translation systems, the user's device can be as simple as just a microphone, or an analog to digital converter, or provide more complex functions such as noise suppression, encoding as coefficients, one or more speech recognition passes, or one or more language processing steps. An off-line design by contrast runs the entire application on the device itself as an embedded application. All computation is done on the device locally and no transmission between a client and a server is needed during use.

Typically, an online design has the advantage that it needs only a very simple client and thus an application can be run on a very simple computing device or mobile phone, while all the heavy computations and processing are done on a large computing server. For speech and machine translation this can mean that more advanced but computationally intensive algorithms can be used, and up-to-date background information can be used. It also has the advantage that the developer or operator of the service can maintain/improve the service or capability on the server, without requiring the user to download or upgrade new system versions.

The disadvantage of an online design is the fact that it critically depends on network connectivity. As a user moves and travels to remote locations, however, connectivity can be intermittent and/or very expensive (roaming), and thus in many ways unavailable. For speech and speech translation systems this requirement is frequently unacceptable. Unlike text or email transmissions, voice cannot permit a temporary lapse of connectivity as it cannot permit a corresponding interruption of the speech stream without losing information or real-time performance. An online design must therefore ensure continuous, real-time transmission and thus continuous connectivity during use.

SUMMARY

In one general aspect, the present invention is directed to a hybrid speech translation system whereby a wireless-enabled client computing device (e.g., a smartphone or a tablet computer) can translate input word phrases (e.g., input speech utterances or input text) from one language to another locally, e.g., an "offline" mode, and also, in an "online" mode when there is wireless network connectivity, have a remote computer, e.g., a back-end speech translation server system, perform the translation and transmit it back to the client computing device via the wireless network for outputting by client computing device (e.g., audibly via a speaker and/or via a text display field). In various embodiments, the user of the client computing device can transition between modes or the transition can be automatic- and transparent to the user-based on user preferences or settings. Further, the back-end speech translation server system can adapt the various speech translation models used by the client computing device in the offline mode based on analysis of user data over time, to thereby configure the client computing device with scaled-down, yet more efficient and faster, models than the back-end speech translation server system, while still being adapted for the user's domain.

These and other benefits of the present invention will be apparent from the description to follow.

FIGURES

Various embodiments of the present invention are described herein by way of example in connection with the following figures, wherein:

FIGS. 1 and 8 are block diagrams of the hybrid speech translation system according to various embodiments of the present invention;

FIGS. 2A-2B and 4A-4B provide sample screen shots of graphical user interfaces through which a user of the client computing device may select a desired language translation pair, and transition from offline mode to online mode and vice versa, according to various embodiments of the present invention;

DETAILED DESCRIPTION

Figure 1:
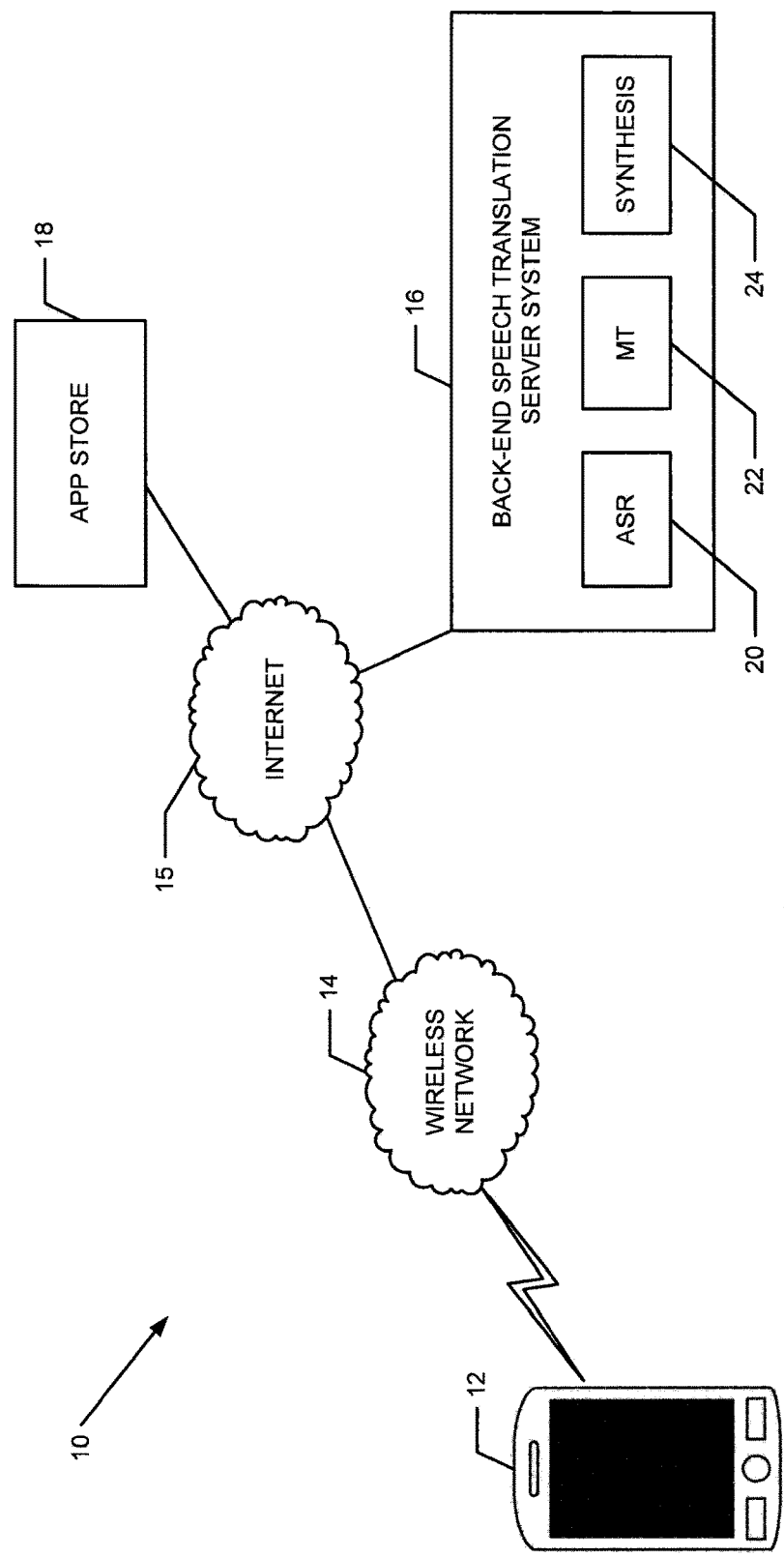

The present invention is directed generally to a speech translation system where a wireless-enabled client computing device (e.g., a smartphone or a tablet computer) has both online (e.g., speech translation processing by a remote computer system) and offline (e.g., speech translation processing embedded on the client computing device) capabilities. FIG. 1 is a block diagram of an example embodiment of the speech translation system 10 according to various embodiments of the present invention. As illustrated in FIG. 1, the system 10 comprises a wireless-enabled client computing device 12, a wireless network 14, a data communications network 15 (e.g., the Internet), a back-end speech translation server system 16, and an application store server system ("app store") 18. The client computing device 12 is used by a user to translate speech utterances received by the client computing device 12 in a first language to a second (or even another) language. The client computing device 12 may be any suitable computing device, such as a desktop or laptop computer, but is more preferably a mobile, handheld computing device, such as smartphone or tablet computer. More details regarding an example client computing device 12 are described below in connection with FIG. 3.

The client computing device 12 also preferably is capable of wireless data communication (i.e., the client computing device 12 is "wireless-enabled") via the wireless network 14. The wireless network 14 may be any suitable wireless network, such as a wireless LAN (WLAN) that uses the IEEE 802.11 WLAN standards, such as a WI-FI network. The wireless network 14 may also comprise a mobile telecommunications network, such as a 3G or 4G LTE mobile phone mobile communication network, although other suitable wireless networks may also be used. The wireless network 14 preferably provides connection to the Internet 15, such as through an access point or base station. The back-end speech translation server system 16 and the app store 18 are connected to the Internet 15 and, hence, in communication with the client computing device 12 via the wireless network 14.

As described herein, the client computing device 12 is provisioned with software (including models) that permits the client computing device 12 to perform offline speech translation or to perform online speech translation, with the back-end speech translation server system 16 providing the computationally intensive speech recognition and/or translation processing steps. The back-end speech translation server system 16 may therefore comprise one or more networked computer servers that perform speech translation based on data received from the client computing device 12 via the wireless network 14. The back-end speech translation server system 16 may therefore comprise, for example: an automatic speech recognition (ASR) module 20 for recognizing the speech in the first language in the inputted speech utterance data; a machine translation (MT) module 22 that converts/translates the recognized in the first language to the selected second language; and a speech synthesis module 24 that synthesizes the translation into the second language to signals for an audible output in the second language. The ASR module 20 may employ, for example, (i) a language model that contains a large list of words and their probability of occurrence in a given sequence, and (ii) an acoustic model that contains a statistical representation of the distinct sounds that make up each word in the language model. The MT module may employ, for example, appropriate translation tables (or models) and language models. The speech synthesis module 24 may employ an appropriate speech synthesis model(s). Similarly, the speech translation software for the client computing device 12 may comprise an ASR module (with language and acoustic models), a MT module (with translation tables/models and language models), and a speech synthesis module (with speech synthesis models). More details for the ASR, MT and synthesis modules (or engines), for the online and offline modes, may be found in U.S. Pat. Nos. 8,090,570 and 8,204,739, which are incorporated herein by reference in their entirety.

The user of the client computing device 12 may purchase speech translation software (or application or "app") via the app store 18. In various embodiments, an online version of the translation app, where the back-end speech translation server system 16 performs the bulk of the speech translation processing assuming a connection to the client computing device 12, is available for free downloading via the app store 18. The online translation app provides the client computing device 12 with a user interface, the capability of collecting input word phrases for translations, such as speech utterances (captured by a microphone on the client computing device 12) or text (via a text field provided by the user interface), and outputting the translation (via speakers of the client computing device 12 and/or textually via the user interface). In such an embodiment, the client computing device 12 may transmit to the back-end speech translation server system 16, via the wireless network 14, data regarding the input phrase to be translated, in the first language, recorded by a microphone of the client computing device 12 or input via the text input field, as the data including for example digital, encoded samples or feature vectors after pre-processing the input speech. Based on the received input data, the back-end speech translation server system 16 translates the speech utterances to the selected second language, and transmits data representative of the translation back to the client computing device 12 via the wireless network 14 for processing, synthesis, and audible outputting via the speakers of the client computing device 12.

Figures 2A, 2B:
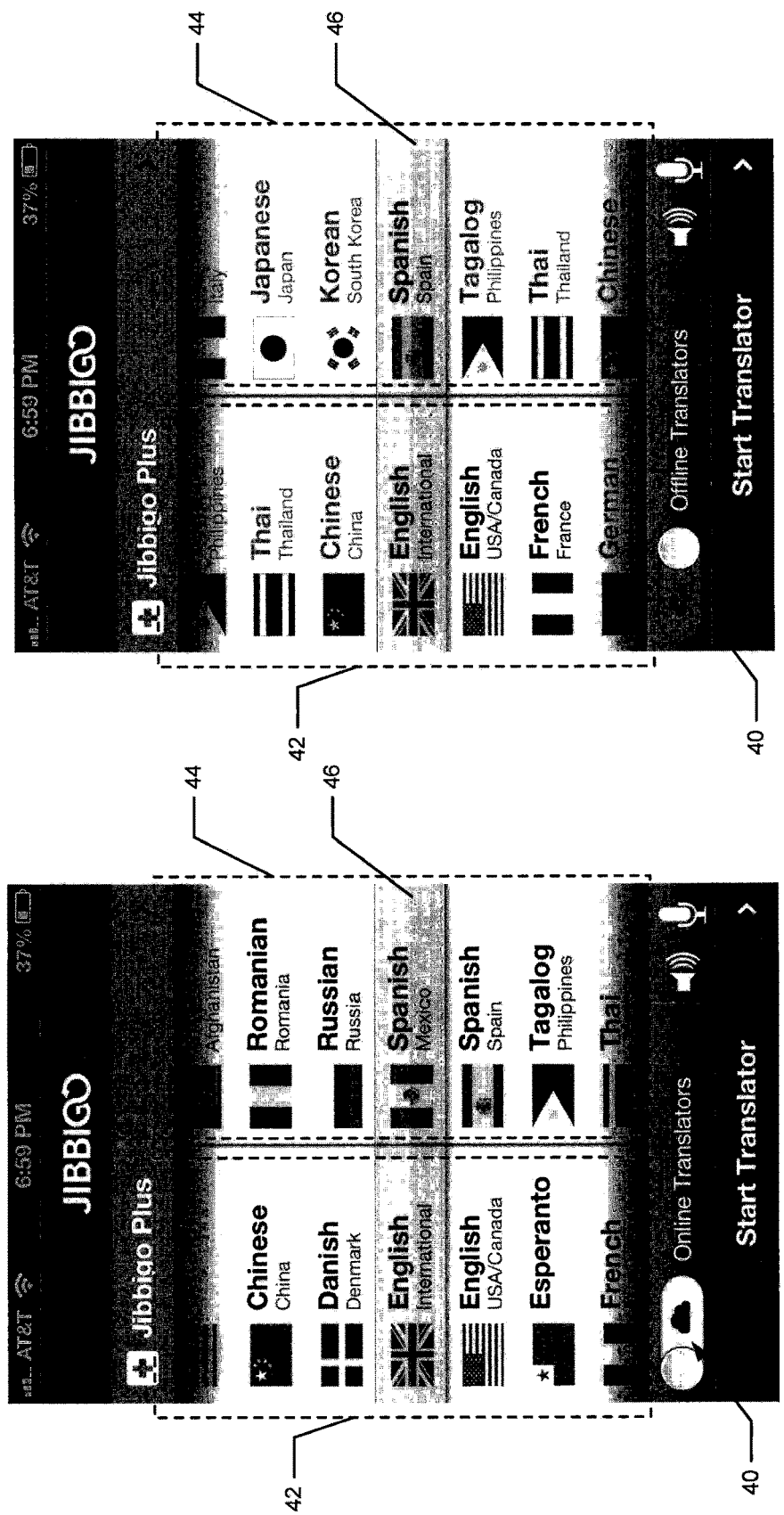

The speech translation app may also be operated in an offline mode, where the client computing device 12 performs the speech translation locally, without connection to the back-end speech translation server system 16. In various embodiments, the user of the client computing device 12, while having connectivity to the wireless network 14, downloads the offline app software for a language pair of choice (e.g., English-Spanish, etc.), so that the offline system can run when network connectivity ceases. FIGS. 2A-B illustrate sample user interfaces for display on the client computing device 12 using the app that allows the user to select the desired language pair. The illustrated sample user interfaces also show that the user can select online or offline mode via a user control. For example, in FIG. 2A the user switched the user control 40 to online, as indicated by the cloud and/or the description "Online Translators"; in FIG. 2B the user switched the user control 40 to offline, as indicated by the diagonal line through the cloud and the description "Offline Translators." In the examples of FIGS. 2A-B, the user can scroll the languages in the first and second columns 42, 44 up and down (much like a scroll wheel) until the user gets a desired language pair, indicated by the languages in the first and second columns at the highlighted selection area 46. In the example of FIG. 2A, the selected language pair is English (International version) and Spanish (Mexico version). In the example of FIG. 2B, the selected language pair is English (International version) and Spanish (Spain version).

In online mode, the user may access any language pair that is offered. This may be indicated to the user by showing in color the icons (e.g., nationality flags) for the available languages in the two columns 42, 44, as shown in FIG. 2A. The user may then scroll the two columns up/down so that the desired language pair is show in the selection area 46. When wireless network connectivity is not available (such as because it was switched off by the user via user control 40 or automatically switched off, as described below), only previously installed language pair on the client computing device 12 are available in various embodiments. Similarly, for the available languages for the offline mode, as shown in FIG. 2B, may be indicated to the user by showing in color the icons (e.g., flags) for the installed languages in the two columns 42, 44, while showing all non-installed languages in grey.

Figure 7:
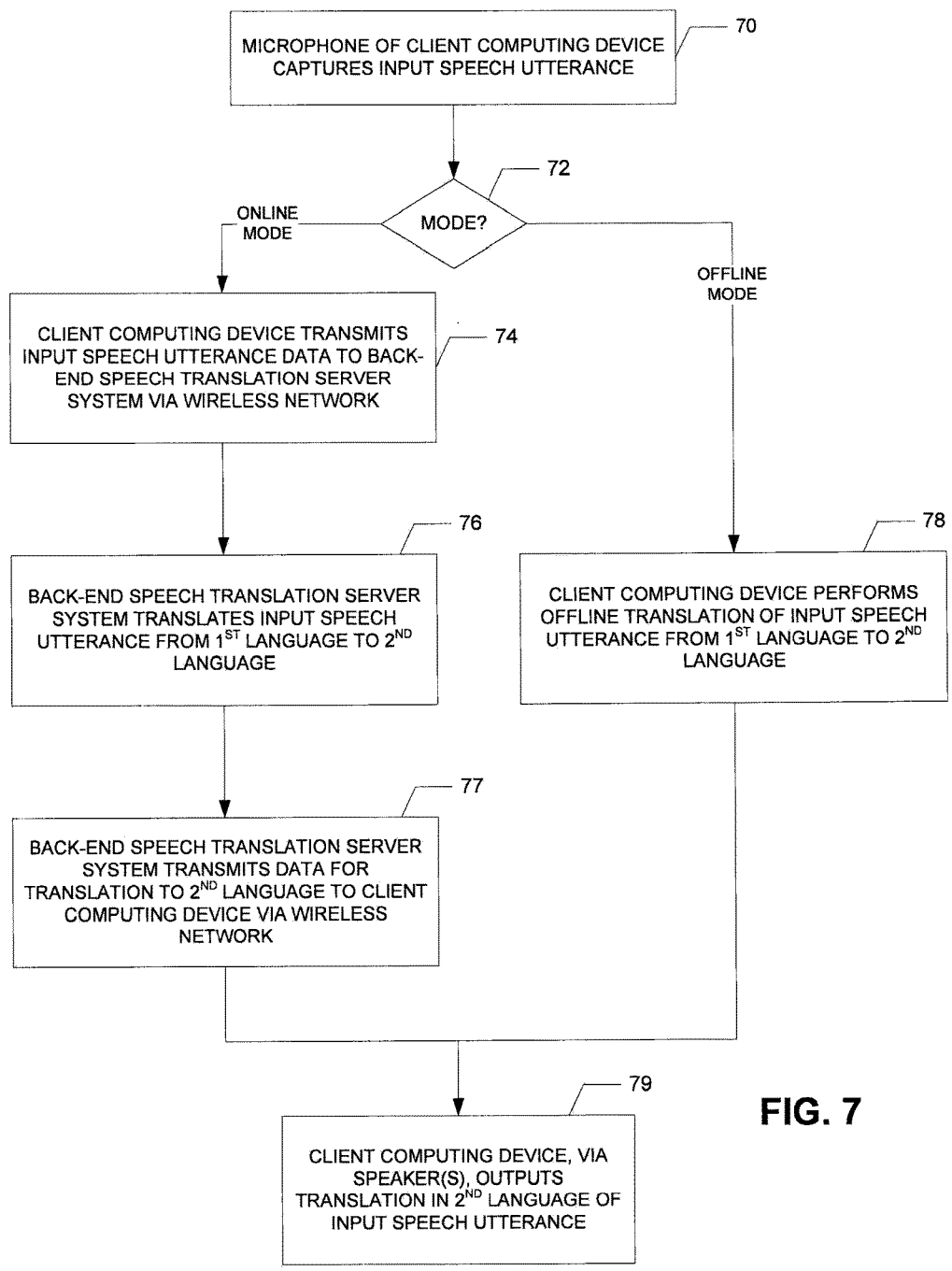
FIG. 7 is a flow chart diagramming the speech translation processing in the offline and online modes according to various embodiments of the present invention.

FIG. 7 is a flowchart illustrating the hybrid online/offline process according to various embodiments. The client computing device 12 (e.g., the microphone thereof) captures an input voice utterance in the first language at step 70. If, step 72, the online mode is being used, at step 74 the client computing device 12 transmits, via the wireless network 14, data (e.g., samples or coefficients of the input speech utterance) regarding the input speech utterance to the back-end speech translation server system 16, which at step 76 translates the utterance to the second language. At step 77 the back-end speech translation server system 16 transmits data for the translation back to the client computing device 12 via the wireless network 14 so that, at step 79, the client computing device 12 (e.g., the speaker(s) thereof) may audibly output the translation in the second language of the input utterance. If at step 72 the offline mode is used, at step 78 the client computing device 12, executing the downloaded offline speech translation software stored in memory, translates the utterance to the second language, and it is output at step 79.

Figure 3:
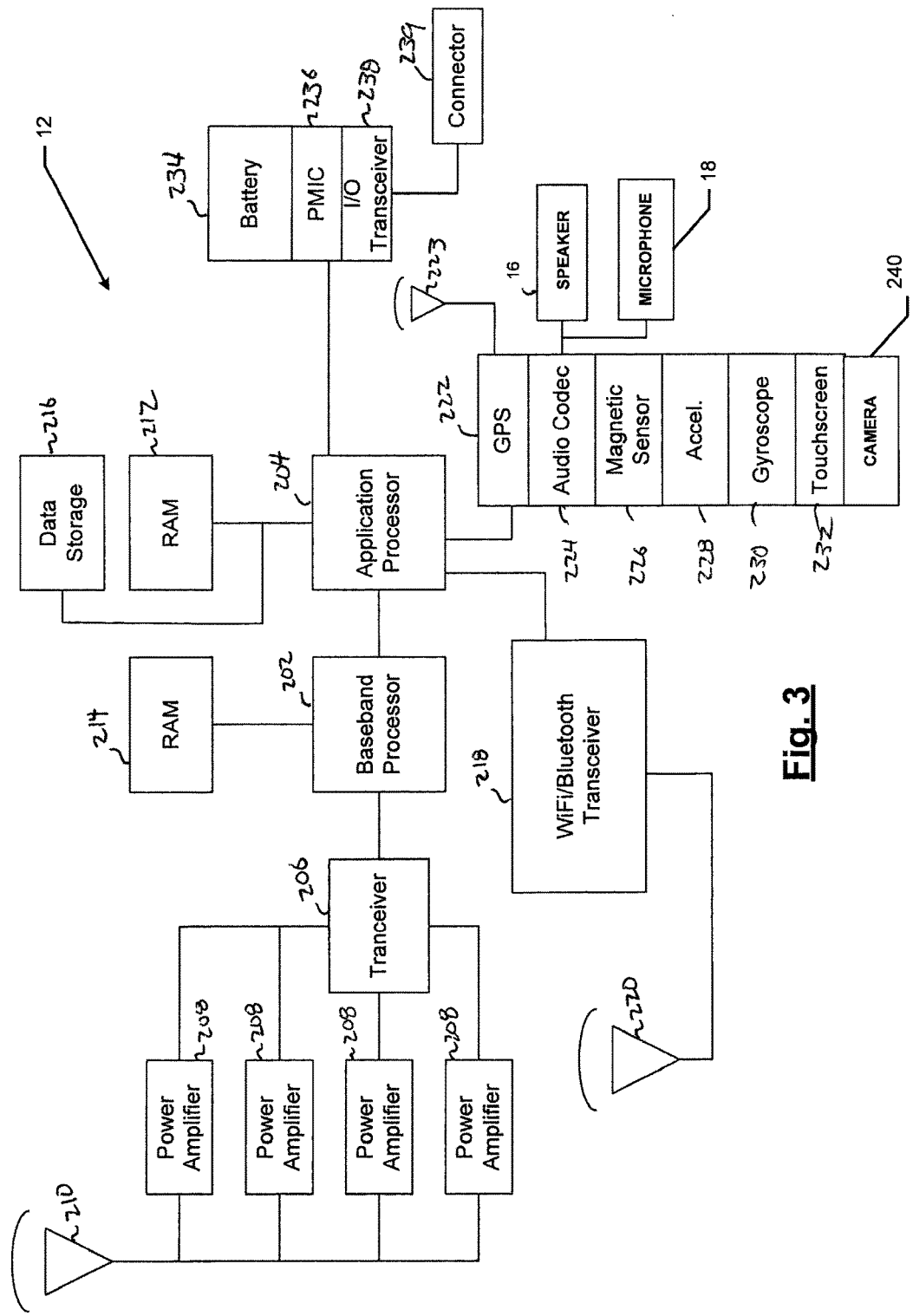
FIG. 3 is a block diagram of the client computing device according to various embodiments of the present invention.

FIG. 3 is a block diagram of the client computing device 12 according to various embodiments. As shown in the example of FIG. 3, the device 12 may comprise multiple processors 202, 204. A baseband processor 202 may handle communication over a mobile telecommunications network (e.g., cellular network) according to any suitable communications technology (e.g., 3G, 4G, etc.). The baseband processor 202 may comprise dedicated random access memory (RAM) 214. In various embodiments, the baseband processor 202 may be in communication with a transceiver 206. The transceiver 206 may, subsequently, be in communications with one or more power amplifiers 208 and an antenna 210. Outgoing signals for the mobile telecommunications network may be processed at baseband by the baseband processor 202 and provided to the transceiver 206. The transceiver 206 and/or the baseband processor 206 may modulate the outgoing signal to a carrier frequency. One or more of the amplifiers 208 may amplify the outgoing signal, which may be subsequently transmitted via antenna 210. Incoming signals for the mobile telecommunications network may be received by the antenna 210, amplified by one or more of the amplifiers 208 and provided to the transceiver 206. Either the transceiver 206 or the baseband processor 202 may demodulate the incoming signal to baseband.

An applications processor 204 may execute an operating system as well as software applications (e.g., downloaded via the app store 18), including the offline and online speech recognition and/or translation functionalities described herein. The applications processor 204 may also execute the software for the touch screen interface 232. The applications processor 204 may also be in communications with applications RAM 212, and non-volatile data storage (e.g., ROM) 216. The RAM 212 may store, for execution by the processor 204, among other things, the application software downloaded via the app store 18 for the offline and online speech translation, including the necessary automatic speech recognition, machine translation, and speech synthesis modules for the offline processing, and the software to communicate with the back-end speech translation server system 16 for the online processing.

The applications processor 204 may additionally be in communication with other hardware devices such as a combination WI-FI/BLUETOOTH transceiver 218. The WI-FI/BLUETOOTH transceiver 218 may handle radio frequency (RF) communication with a LAN (e.g., according to the WI-FI standard, or any suitable standard) or direct RF communications between the device 200 and another wireless device (e.g., according to the BLUETOOTH standard or any suitable standard). In various embodiments, the device 200 may also comprise a global positioning system (GPS) 222 that is in communication with a satellite-based GPS system via a GPS antenna 223 for providing the application processor 204 information describing the geographic location of the device 12. The touch screen 232 may both provide output to the user of the device 12 in visual form and receive input from the user. The input may be in the form of signals representing screen-touches by the user. An audio codec module 224 may provide hardware and/or software for decoding and playing audio signals. In some embodiments, the codec 224 may also comprise a digital-to-analog converter. Audio output signals may be provided to the device speaker 16 and/or a jack (not shown) that may receive a set of headphones and/or speakers for playing the audio output signal. Audio input signals may be provided via the device microphone(s) 18. The device may also comprise a digital camera 240.

Various other sensors may be included in certain embodiments. A magnetic sensor 226 may sense magnetic fields near the device. For example, the magnetic sensor 226 may be used by various apps and/or system functionality to implement a compass. An accelerometer 228 and gyroscope 230 may provide data describing movement of the device. For example, data from the accelerometer 228 and gyroscope 230 may be used to orient the display of the touch screen 232 (e.g., portrait versus landscape). The device 200 may be powered by a battery 234, which may, in turn, be managed by a power management integrated circuit (PMIC) 236. An I/O transceiver 238 may manage wired communications between the device and other devices, for example, according to the Universal Serial Bus (USB) or any other suitable standard. A connector 239 may facilitate wired connections. In some embodiments, connections via the connector 239 and I/O transceiver 238 may provide power for charging the battery 234.

Figure 5:
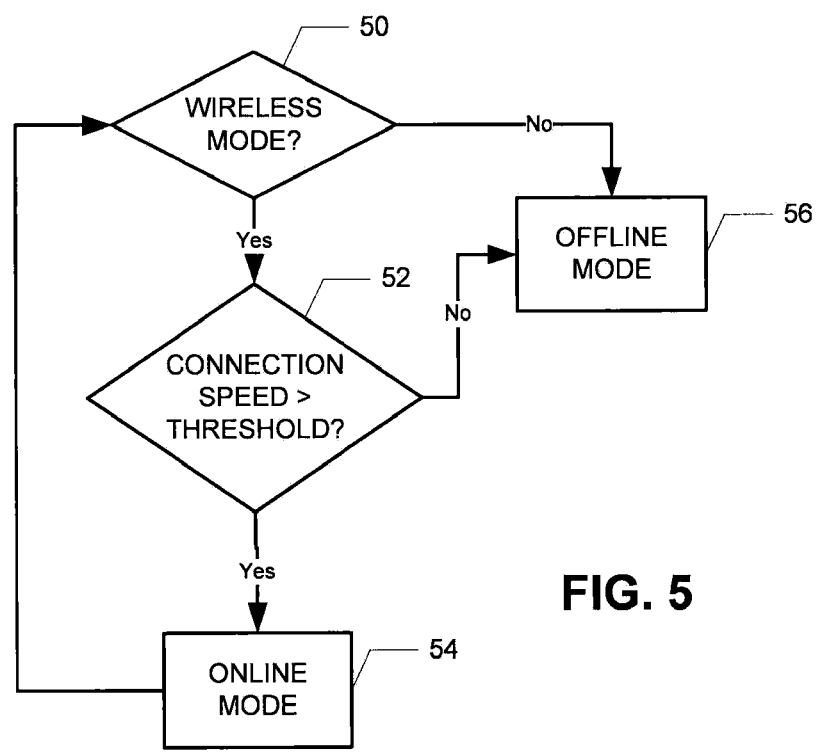
FIG. 5 is a flow chart diagramming a process of the client computing device for automatically transitioning between the offline and online modes according to various embodiments of the present invention.

As described above, in various embodiments the user can switch between online and offline modes, such as by activation of the user control 40 as shown in the examples of FIGS. 2A and 2B. Online processing preferably provides larger vocabularies in the language models than offline processing, but offline processing may provide enhanced user privacy and security as data for the user input utterances are not transmitted via the wireless network 14 and the Internet. The translation app software may also allow the client computing device 12 to automatically switch between online and offline modes according to various embodiments. For example, the user may provision the settings for the app so that if the wireless network 14 is available (e.g., network connectivity with suitable data rates/connection speed), the online operating mode is used; otherwise the offline operating mode. Accordingly, for such an embodiment, as shown in the example flow chart of FIG. 5, if the client computing device 14 is in a wireless communication mode (e.g., WiFi or cell phone network, such as 3G or 4G) (step 50), the processor of the client computing device 12, executing the app software stored in the memory, may check the data rate/connection speed for the WiFi network (step 52), and if it is above a threshold data rate/connection speed, the online mode is used (step 54); otherwise the offline mode is used (step 56). This way, the user has automated, continuous translation capability and the use of either offline or online modes is transparent to the user. The client computing device 12 may visually display which of the modes is being used at a given time (such as with the cloud and no-cloud icons described above).

In other embodiments, the processor of the client computing device 12, executing the app software stored in the memory, may automatically switch between the online and offline operating modes based on other factors, such as: cost (e.g., if roaming charges apply, or if there is no network connectivity, the offline operating mode is used; otherwise online mode is used); quality (e.g., better translation, acoustic or language models, e.g., usage of offline speaker specific, or online general domain independent models); location (e.g., based on GPS coordinates as determined by the GPS system 222); privacy (e.g., use the online mode only if a secure wireless network is available); and/or time (e.g., specified modes during specified times of day). In various embodiments, the user of the client computing device 14 may configure the app through its settings to establish the applicable criteria for automatically transitioning between the online and offline operating modes. For example, the user could select, according to various embodiments, to: always use offline mode (in which case online mode is never used); prefer the fastest service (in which case online mode is used only if the connection speed of the wireless network exceeds a threshold); the most accurate translations (in which case online mode is used whenever available); limit costs (in which case, for example, offline mode is used when roaming charges are applicable). Such user preferences may be influenced by privacy (data transmission), quality (size and performance of speech translation models), or cost (data roaming) considerations.

Figures 4A, 4B:
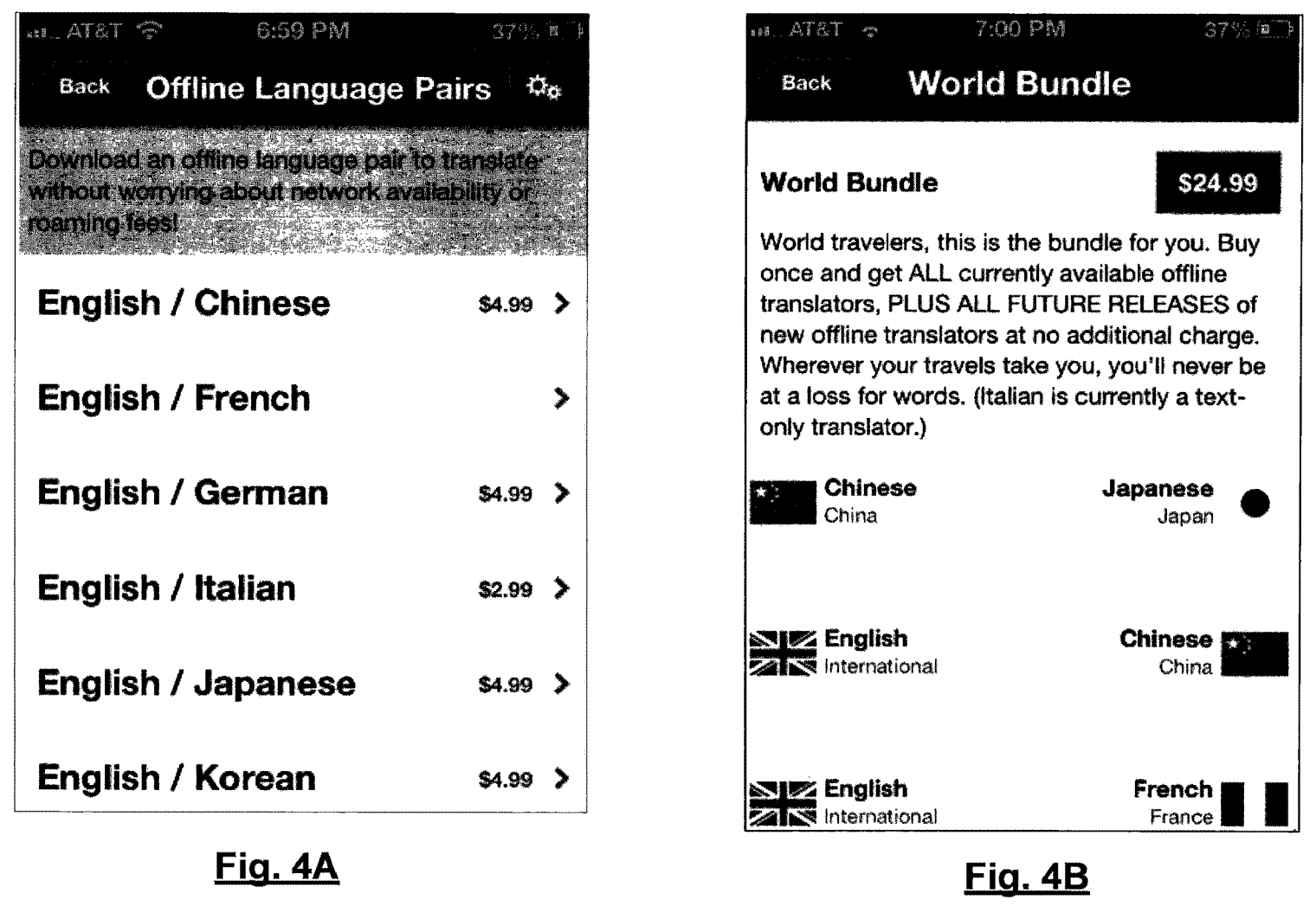

Another aspect of the hybrid offline/online translation system is the language pairs made available on the client computing device 12 for offline mode. Because of memory size limitations for the client computing device 12, in most cases it is impractical to download all available language pairs to the client computing device 12. As such, the user of the client computing device 12 preferably downloads to the client computing device 12 only selected language pairs that the user needs. For example, in various embodiments, the user may chooses or purchases available offline language pairs through the app store 18. In various embodiments, the user could purchase a package that comprises several language pairs (such as languages for a geographic area, such as Europe, Southeast Asia, etc., or versions of the same language, such as Mexico and Spain versions of Spanish, Portugal and Brazil versions of the Portuguese, etc.), in which case the software apps for all of the language pairs in the package are available for downloading to the client computing device 18. For example, FIG. 4A shows a sample screen shot where a user may choose to purchase various translation language pairs; and FIG. 4B shows a sample screen shot for a package of the translation language pairs (in this example, a world package). If the user wishes to remove a language pair from the client computing device to same memory, the user is able, in various embodiments, to remove that pair and the models that correspond to it, without losing their availability. That is, the user may download the models again at a later date.

In one embodiment, the choice to download a language pair is left to the user, and the user selects the pairs to be installed on the client computing device for offline translation. If the user desired to install a selected language pair(s) but there is not satisfactory network connectivity, the client computing device stores and request and issues a reminder message to the user to download the pair when network connectivity is next available. The reminder message queries the user whether he/she wishes to download the offline version of the selected language pair(s) and proceeds with the download if confirmed by the user.

In another embodiment, the client computing device 12 itself may manage the offline translation pairs for the user. For example, the client computing device 12 may maintain data regarding languages used around the world, and may automatically download an offline language pair that is relevant to the location of the user. For example, if the GPS system 22 shows that the user is in Spain, the Spain version of Spanish may be downloaded, and so on. Also, the offline language pairs could be automatically downloaded based on, for example, calendar data for the user (e.g., a trip) or web search data that indicates a user's interest in or plain to travel to a particular region of the world.

Access to a user's location (e.g., based on GPS data) and/or interests (e.g., based on internet search data and/or speech translation queries) also offers customization of the speech translation system in its language behavior. Certain words, location names and food types may be preferred. Particularly, names (location names, person names) will likely be more or less relevant and likely dependent on location (e.g., Kawasaki and Yamamoto for Japan, versus Martinez or Gonzales for Spain, etc.). The modeling parameters of the recognition and translation models, most importantly their vocabularies and likely translations, may therefore be adjusted based on location and interests of the user. In an online mode, this can all be done dynamically during use, using established adaptation algorithms. But in an offline system, not all words should be stored and memory must be conserved to achieve efficiency on a mobile device. The system may therefore, in various embodiments, download customized parametric models even for offline/embedded systems from the back-end speech translation system 16, when network connectivity is available, and swap in and out vocabulary items, language models and modified probabilistic acoustic parameters.

The most memory intensive aspects of a speech translation system are typically given by the translation tables and language models of a machine translation engine, the acoustic and language models of the recognition engine, and the voice parameters of a speech synthesis engine. To reduce the size of the models for the offline translation app localized on the client computing device 12, different techniques depending on the type of the model can be used. Models having probabilities as model parameters such as acoustic models and language models can be reduced by quantizing the value range of the probabilities so that the value range can be mapped from a continuous to a discrete space with a fixed number of value points only. Depending on the quantization factor, the storage requirements can be reduced to a byte or a few bits only. Models storing phrases of words, such as translation tables and language models, can use efficiently implemented storing techniques such as prefix trees. In addition, memory-mapping techniques can be used which load only small parts of the models dynamically on demand into the RAM 212/214, while unneeded parts remain untouched in the non-volatile storage 216.

Another, more sophisticated approach for reducing language models and/or translation models to a given size so that they run on an offline client computing device is to use special trimming/expansion heuristics that either eliminates vocabularies and word N-grams or expanding a base model by adding additional information. Elimination may be done in an opportunistic manner so that a user's most likely words and expressions are still represented despite the resource limitations, e.g. by limiting the vocabulary to a user-specific subset only and selecting only those parts of a general model that is covered by this vocabulary or by automatically collecting user-specific information from the queries of the user and selecting those parts of the general model that are closely related to the user's queries. Expansion on the other hand may be done by selecting only user specific—e.g. based on the users speaking style—and/or domain specific—e.g. for tourism usage or humanitarian usage and/or situation specific—e.g. based on the GPS location—and/or general, not related to any of the above specific information on the server, transferring this (delta) information only from the server to the device and applying this information to a base model stored on the device.

Figure 6:
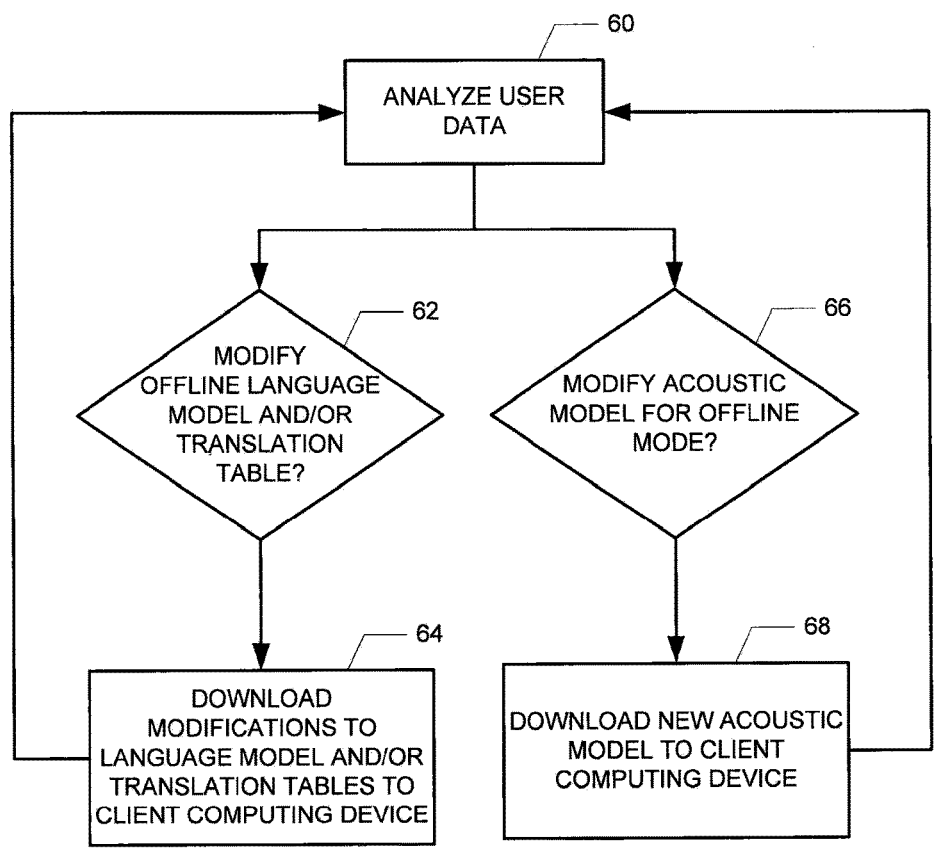
FIG. 6 is a flow chart diagramming a process of updating various models and table of the offline speech translation of the client computing device according to various embodiments of the present invention.

For example, with reference to the flowchart of FIG. 6, at step 60 the back-end speech translation server system 16 may analyze the user data to determine, at step 62, whether the user's offline language model and/or translation table should be updated to, for example, eliminate seldom used words or expressions, while maintaining commonly used words and expressions of the user or extracting commonly used translations and expressions on the server and applying them to a base model stored on the client computing device. As mentioned above, the back-end speech translation server system 16 may analyze the user's translation queries (e.g., expressions to be translated) and/or internet browsing history, to determine the words and expressions commonly (and not commonly) used. As such, in various embodiments, the user's translation queries in offline mode may be saved and stored by the client computing device 12, and uploaded to the back-end speech translation server system 16 during a period of network connectivity so that they can be analyzed by the back-end speech translation server system 16. Similarly, the user's internet browsing history (e.g. cookie data) may be uploaded to the back-end speech translation server system 16 during a period of network connectivity so that they can be analyzed by the back-end speech translation server system 16 to determine the words and expressions commonly (and not commonly) used by the user. If, through its analysis of the user data, the back-end speech translation server system 16 determines that the language models and/or translation tables of the client computing device's offline processing software should be updated, the updated software (e.g. models) are downloaded to the client computing device (e.g., from the back-end speech translation server system 16) at step 64. Instead of downloading the full models, also downloading just the (delta) information that is required to update the model on the client computing device is possible.

Similarly, user specific information might also be useful for reducing the size of the acoustic model by, for example, substituting a more general acoustic model by a smaller user-specific one. Depending on the amount of user-specific data, this can be achieved, for example, by either using acoustic model adaptation techniques such as MLLR or fully retraining the acoustic model using the new data in addition. Thus, for example, referring again to FIG. 6, if at step 66 the back-end speech translation server system 16 determines that the offline-mode acoustic model for the user's client computing device 12 should be modified based on the analysis of the user data, the updated software (e.g., acoustic model) is downloaded to the client computing device (e.g., from the back-end speech translation server system 16) at step 68.

In a speech-to-speech translation system the most speed-limiting element are the speech recognition algorithms, as they perform searches over many acoustic hypotheses and many time slices of the speech signal. The speed of the algorithmic searches is affected predominantly by the size of the acoustic model set. In order to maintain the speed of the offline system when performing speech-to-speech translation on the client computing device 12, several techniques can be used. For example, in one embodiment, depending on the size of the model, look-up tables can be used for computing the Mahalanobis distances between the model and input speech instead of computing the distances on demand. In addition, Gaussian selection techniques may used in the offline mode to reduce the overall amount of model parameters that need to be evaluated. As soon as user specific information is available, smaller, more efficient user specific models can be used instead, as described above in connection with FIG. 6.

Figure 8:
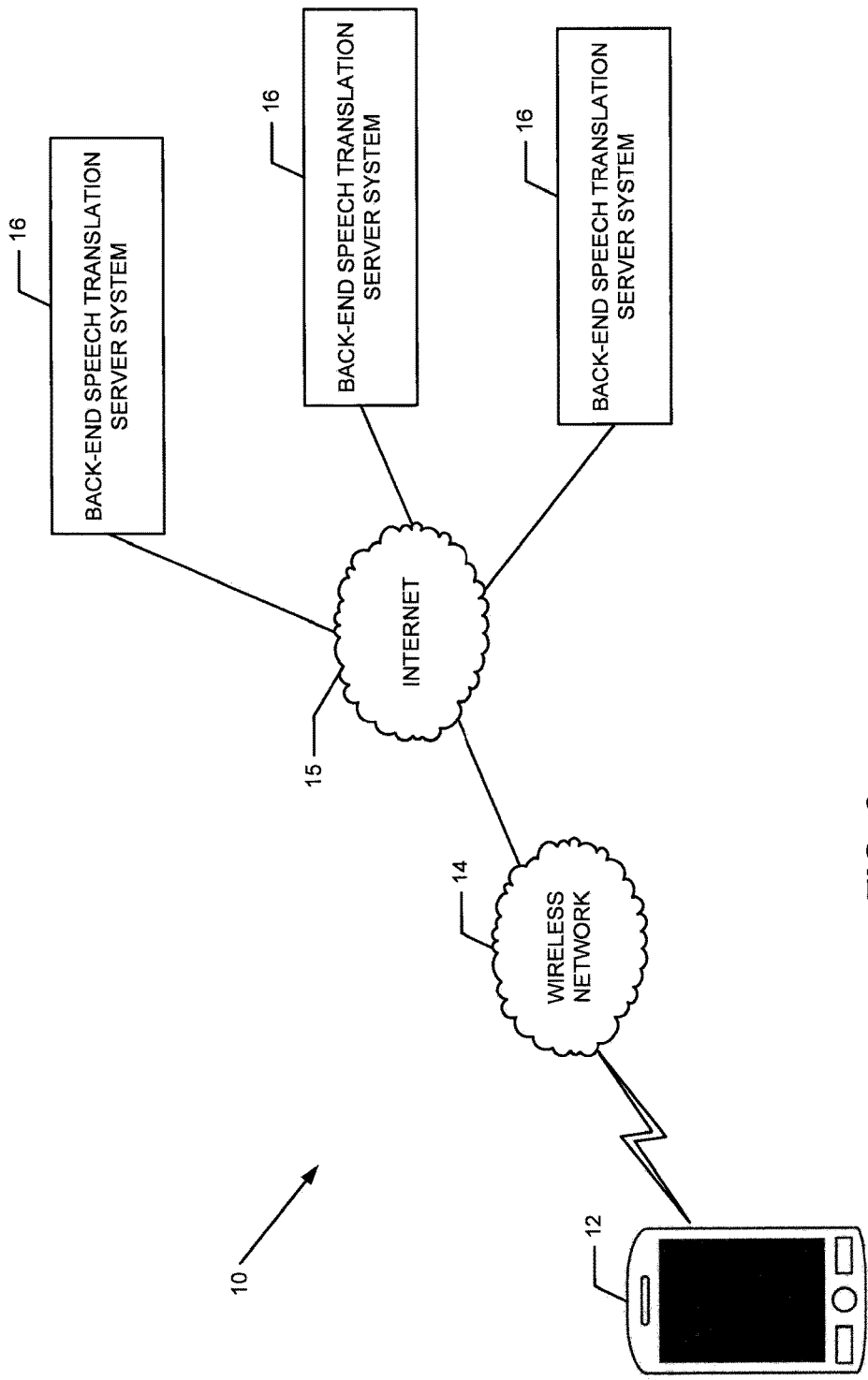

In addition, according to various embodiments, during online mode, the back-end speech translation system 16 may use and combine multiple speech recognition and translation engines (modules). These backend engines can be provided by the same speech translation provider and run on the same server, for example, or in other embodiments could be provided by independent speech translation providers at different locations, as illustrated in the example of FIG. 8, which shows three separate and independent back-end speech translation systems 16, although in other embodiments fewer or more back-end speech translation systems 16 could be used. In such an embodiment, each of the back-end speech translation systems 16 may be requested to perform the translation simultaneously through the Internet 15. In such an embodiment, the back-end speech translation systems 16 are in communication (e.g., through the Internet 15) and one of the back-end speech translation systems 16 either chooses the better of the translations or combines them. To decide between multiple systems/translation and/or on how strongly to weight either system in combination, confidence measures in ASR and confidence measures for MT may be used. Such confidence measures are used to determine the reliability of an ASR or an MT hypothesis. If two or more ASR or MT engines are to be merged in such an embodiment, system combinations may be used, such as "ROVER" methods of combining ASR outputs (see e.g., J. G. Fiscus, "A post-processing system to yield reduced error word rates: Recognizer output voting error reduction (ROVER)," IEEE Workshop on Automatic Speech Recognition and Understanding, pp. 347-354, 1997), cross-adapting one system against the other, or MT system combination techniques (see, e.g., Rosti et al., "Combining Outputs from Multiple Machine Translation Systems," Proc. of NAACL HLT, pp. 228-235, 2007 and K. Heafield et al., "Combining Machine Translation Output with Open Source," Prague Bulletin of Mathematical Linguistics, No. 93, pp. 27-36, 2010). In such an embodiment, the selected and combined hypotheses can compete in the backend to produce the best output for the user. Once this has been done in online mode, the system will remember the best choice arrived in this manner for introduction in the offline system. For learning of the offline system, the combined online systems 16 may retain the recognition hypotheses of multiple ASR engines and/or translation hypotheses from multiple MT engines in memory and uses the combination, or the better of these hypotheses, to adapt or to train new offline systems. Such retrained or adapted systems may be subsequently swapped back in on the offline systems, when the wireless network is available.

In one general respect, therefore, the present invention is directed to speech translation systems and methods for hybrid, offline and online speech translation. According to various embodiments, the system may comprise a back-end speech translation server system and a client computing device that is configured for communicating with the back-end speech translation server system via a wireless network. The client computing device may comprise a microphone, a processor connected to the microphone, a memory connected to the processor that stores instructions to be executed by the processor, a speaker connected to the processor. The client computing device is for outputting, e.g., via the speaker or a text display field, a translation of input word phrases for translation (e.g., speech utterances or input text) from a first language to a second language. The memory stores instructions such that, in a first operating mode (offline mode), when the processor executes the instructions, the processor translates the input word phrases to the second language for output (e.g., via the speaker). In a second operating mode (online mode): (i) the client computing device transmits to the back-end speech translation server system, via the wireless network, data regarding the input word phrases in the first language received by the microphone; (ii) the back-end speech translation server system determines the translation to the second language of the input word phrases in the first language based on the data received via the wireless network from the client computing device; and (iii) the back-end speech translation system transmits data regarding the translation to the second language of the input word phrases in the first language to the client computing device via the wireless network such that the client computing device outputs the translation to the second language of the speech utterances in the first language.

According to various implementations, the client computing device has a user interface that permits a user to switch between the first operating mode and the second operating mode. Alternatively, the client computing device automatically selects whether to use the first operating mode or the second operating mode based on a connection a user preference setting of the user for the client computing device. In addition, the client computing device may store in memory a local acoustic model, a local language model, a local translation model and a local speech synthesis model, for, in the first operating mode, recognizing the speech utterances in the first language and translating the recognized speech utterances to the second language for output via the speaker. Also, the back-end speech translation server system comprises a back-end acoustic model, a back-end language model, a back-end translation model and a back-end speech synthesis model for, in the second operating mode, determining the translation to the second language of the speech utterances in the first language based on the data received via the wireless network from the client computing device. The local models are different from the back-end models (e.g., a subset or other variation).

In addition, the back-end speech translation server system may be programmed to: (i) monitor over time speech utterances received by the client computing device for translation from the first language to the second language; and (ii) update at least one of the local acoustic model, the local language model, the local translation model and the local speech synthesis model of the client computing device based on the monitoring over time of speech utterances received by the client computing device for translation from the first language to the second language. The client computing device may also comprise a GPS system for determining a location of the client computing device. In such an embodiment, the back-end speech translation server system may also be programmed to update at least one of the local acoustic model, the local language model, the local translation model and the local speech synthesis model of the client computing device based on the location of the client computing device. Any such updates to the at least one of the models of the client computing device may be transmitted from the back-end speech translation server system to the client computing device via the wireless network.

Additionally, the client computing device may be configured to download application software (including the models) for a language translation pair that comprises the first and second languages, particularly when suitable connectivity between the client computing device and the back-end speech translation server system is available via the wireless network. Also, for embodiments where the client computing device comprises a GPS system, the client computing device may be configured to download the application software for the language translation pair based on the determined location of the client computing device and when suitable connectivity between the client computing device and the back-end speech translation server system is available via the wireless network.

Furthermore, the client computing device may comprise a graphical user interface having a first language display section and a second language display section that are simultaneously displayed. Each of the first and second language display sections may comprise a user-accessible listing of a plurality of languages, such that upon a user of the client computing device selecting the first language from the listing in the first language display section and the second language in the second language display section, the client computing device is thereby configured to translate the input speech utterances from the first language to the second languages. Languages available in the first (offline) operating mode may be designated differently in the first and second language display sections from languages that are unavailable in the first operating mode.

In addition, in various embodiments, the back-end speech translation server system is one of a plurality of a back-end speech translation server systems, and the client computing device is configured for communicating with the each of the plurality of back-end speech translation server systems via a wireless network. In the second (online) operating mode, each of the plurality of back-end speech translation server systems determines a translation to the second language of the input word phrases in the first language based on the data received via the wireless network from the client computing device. In such circumstances, one of the plurality of back-end speech translation server systems selects one of the translations from the plurality of back-end speech translation server systems for transmitting to the client computing device, or two or more of the translations from the plurality of back-end speech translation server systems are merged to generate a merged translation for transmitting to the client computing device.

In one general aspect, the speech translation method comprises, in a first (offline) operating mode: (i) receiving by a client computing device a first input word phrase in a first language; (ii) translating by the client computing device the first input word phrase to a second language; and (iii) outputting by the client computing device the first speech utterance in the second language (e.g., audibly via a speaker and/or visually via a text display field). The method further comprises transitioning by the client computing device from the first operating mode to the second operating mode, and then, in the second (online) operating mode: (iv) receiving by a client computing device a second input word phrase in a first language; (v) transmitting, by the client computing device, via a wireless network, data regarding the second input word phrase to a back-end speech translation server system; and (vi) receiving, by the client computing device, from the back-end speech translation server system via the wireless network, data regarding a translation by the back-end speech translation server system of the second input word phrase from the first language to the second language; and outputting by the client computing device the first speech utterance in the second language.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems, mobile devices, smartphones and/or processors. Software that may cause programmable equipment to execute processes may be stored in any storage device, such as, for example, a computer system (nonvolatile) memory, RAM, ROM, Flash Memory, etc. Furthermore, at least some of the processes may be programmed when the computer system is manufactured or stored on various types of computer-readable media.

A "computer," "computer system," "host," "server," or "processor" may be, for example and without limitation, a processor, microcomputer, minicomputer, server, mainframe, laptop, personal data assistant (PDA), wireless e-mail device, cellular phone, smartphone, tablet, mobile device, pager, processor, fax machine, scanner, or any other programmable device configured to transmit and/or receive data over a network. Computer systems and computer-based devices disclosed herein may include memory for storing certain software modules or engines used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. The software modules and engines described herein can be executed by the processor (or processors as the case may be) of the computer devices that access the memory storing the modules.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A method comprising:
   receiving at a client device, from a user of the client device, a verbally input phrase in a first language;
   determining a second language for translation of the verbally input phrase;
   receiving, from the user, a translation mode setting for the client device for the translation of the verbally input phrase into the determined second language, the translation mode setting comprising a privacy preference of performing the translation at the client device when a wireless network connected to the client device is not secure;
   responsive to determining that a connection speed of the wireless network is below a predetermined speed threshold or the wireless network is not secure, automatically selecting to perform the translation at the client device based on the translation mode setting received from the user, the translation comprising:
    determining a local translation of the verbally input phrase in the second language;
    outputting the local translation of the verbally input phrase in the second language;
responsive to determining that a connection speed of the wireless network exceeds the predetermined speed threshold and the wireless network is secure, automatically selecting to perform the translation at a translation server based on the translation mode setting received from the user, the translation comprising:
    sending information associated with the verbally input phrase from the client device to the translation server via the wireless network;
    receiving data regarding a server translation of the verbally input phrase in the second language at the client device from the translation server via the wireless network; and
    outputting the server translation of the verbally input phrase in the second language based on the data received from the translation server.

2. The method of claim 1, wherein the second language is determined by receiving a user input designating the second language.

3. The method of claim 1, wherein the second language is automatically determined by the client device based on a location of the user.

4. The method of claim 1, wherein the second language is automatically determined by the client device based on language pairs that have been downloaded to the client device.

5. The method of claim 1, wherein determining the local translation comprises translating the verbally input phrase using offline speech translation software for a language pair comprising the first language and the second language, the offline speech translation software being previously downloaded by the client device.

6. The method of claim 1, further comprising: determining a location of the client device; and
    downloading, by the client device from the translation server, offline speech translation software for a language translation pair comprising the first language and the second language based on the determined location of the client device.

7. A non-transitory computer-readable medium comprising instructions that, when executed by one or more processors, cause the one or more processors to perform steps comprising:
    receiving at a client device, from a user of the client device, a verbally input phrase in a first language;
    determining a second language for translation of the verbally input phrase;
    receiving, from the user, a translation mode setting for the client device for the translation of the verbally input phrase into the determined second language, the translation mode setting comprising a privacy preference of performing the translation at the client device when a wireless network connected to the client device is not secure;
responsive to determining that a connection speed of the wireless network is below a predetermined speed threshold or the wireless network is not secure, automatically selecting to perform the translation at the client device based on the translation mode setting received from the user, the translation comprising:
    determining a local translation of the verbally input phrase in the second language;
    outputting the local translation of the verbally input phrase in the second language;
responsive to determining that a connection speed of the wireless network exceeds the predetermined speed threshold and the wireless network is secure, automatically selecting to perform the translation at a translation server based on the translation mode setting received from the user, the translation comprising:
    sending information associated with the verbally input phrase from the client device to the translation server via the wireless network;
    receiving data regarding a server translation of the verbally input phrase in the second language at the client device from the translation server via the wireless network; and
    outputting the server translation of the verbally input phrase in the second language based on the data received from the translation server.

8. The non-transitory computer-readable medium of claim 7, wherein the second language is determined by receiving a user input designating the second language.

9. The non-transitory computer-readable medium of claim 7, wherein the second language is automatically determined by the client device based on a location of the user.

10. The non-transitory computer-readable medium of claim 7, wherein the second language is automatically determined by the client device based on language pairs that have been downloaded to the client device.

11. The non-transitory computer-readable medium of claim 7, wherein determining the local translation comprises translating the verbally input phrase using offline speech translation software for a language pair comprising the first language and the second language, the offline speech translation software being previously downloaded by the client device.

12. The non-transitory computer-readable medium of claim 7, wherein the steps further comprise:
    determining a location of the client device; and
    downloading, by the client device from the translation server, offline speech translation software for a language translation pair comprising the first language and the second language based on the determined location of the client device.

\* \* \* \* \*